E. H. ANGIER.
PACKAGE.
APPLICATION FILED OCT. 31, 1917.
1,432,010.                                             Patented Oct. 17, 1922.
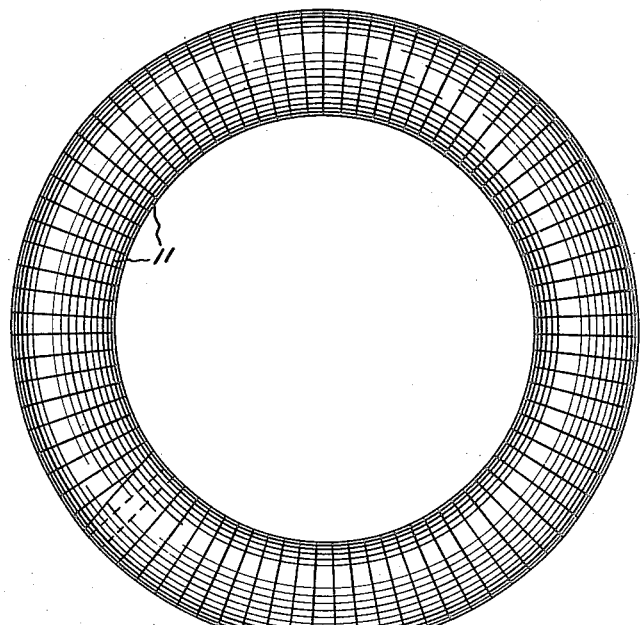
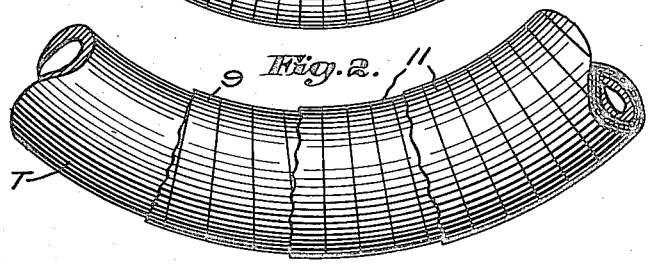
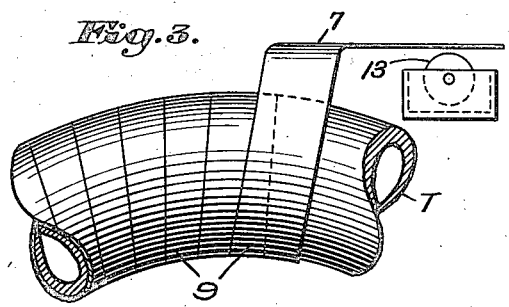 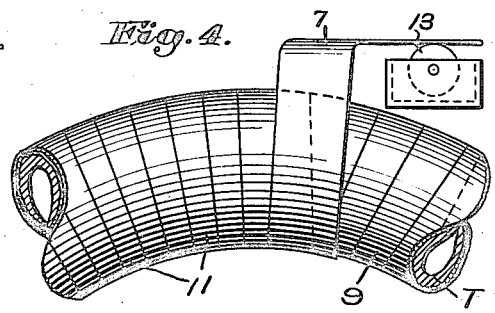
Inventor:
Edward H. Angier,
Emery, Booth, Janney & Varney
Attys.

Patented Oct. 17, 1922.

1,432,010

UNITED STATES PATENT OFFICE.

EDWARD H. ANGIER, OF FRAMINGHAM, MASSACHUSETTS.

PACKAGE.

Application filed October 31, 1917. Serial No. 199,599.

*To all whom it may concern:*

Be it known that I, EDWARD H. ANGIER, a citizen of the United States, and resident of Framingham, in the county of Middlesex and Commonwealth of Massachusetts, have invented an Improvement in Packages, of which the following description, in connection with the accompanying drawings, is a specification, like characters on the drawings representing like parts.

This invention relates to packages and the particular purpose is to provide an improved form of package for enclosing a ring-shaped article or group of articles. Examples of such articles are coils of wire and vehicle tires.

My invention will best be understood by reference to the following description taken in connection with the accompanying drawings wherein:—

Fig. 1, is a side elevation of the completed package;

Fig. 2 is a view of a portion of the package with parts successively broken away to disclose the construction;

Fig. 3 is a diagrammatic view illustrating the steps in the wrapping operation; and Fig. 4 is a similar view illustrating a later stage thereof.

The nature of the illustrative package herein disclosed will most readily be understood from a description of the method employed in making the same and I shall therefore first set forth in detail the preferred manner of applying the wrapping material about such an article as a tire. Referring particularly to Figs. 3 and 4, I utilize for wrapping a tire T suitable strip material such as a comparatively narrow band 7 of paper or the like. This strip may be wound about the transverse circumference of the ring-like article in helical convolutions 9 until the entire surface of the tire is covered. This wrapping may be applied, if desired, by any of the well known types of tire wrapping machines which utilize an annular strip-carrying shuttle. The overlap of the turns 9 as illustrated in Fig. 3 may be comparatively small, the object of this first wrap being to apply a preliminary covering about the tire.

When the tire has thus been covered the wrapping with helical turns may be continued and this may be done, if desired, with the same strip. Several of these turns are shown in Fig. 4 and marked with the numeral 11 and as they are being applied the strip 7 is preferably treated with suitable adhesive and preferably with adhesive having a certain water-proof quality. This is diagrammatically indicated in Fig. 4 by the showing of the strip 7 in contact with a moistening roll 13. The turns 11 of the strip are thus caused to adhere one to the other and also to the underlying turns 9 of the preliminary wrapping, which preliminary wrapping protects the tire or other article from coming in contact with the adhesive. The turns 11 are preferably continued to form a number of circuits about the tire, as indicated in Fig. 2, and they may be applied in any desired manner, but conveniently, as shown in Fig. 4, the pitch is decreased to provide a much larger overlap than is necessary with the turns 9, so that a thick wall of wrapping material is rapidly built up in comparatively few circuits about the tire. The various layers of turns 11 as shown in Fig. 2 are thoroughly smeared with adhesive during their application and as this adhesive dries all the parts are secured together and conglutinated into a unitary imperforate shell exactly conforming to the article enclosed. The consistency of this shell formed by the layers of paper merged, as it were, into a whole by the solidified adhesive may be varied by a proper choice of the adhesive used. It may be leathery and so be practically like a hide or skin on the article enclosed or stiff and like a bark or carapace. I have obtained good results by the use of silicate of soda which forms a hard shell of the latter type and which is practically waterproof under ordinary circumstances of use.

It will be seen that by my invention I construct in situ about the article a protecting covering of a resistant nature which is absolutely without seam or opening, is thoroughly weatherproof and which is closely adapted to the shape of the article since it is formed directly thereon, as a mandrel. By constructing this wrapping of narrow strip it is possible to draw each turn tightly and smoothly about the article without wrinkles or undesirable fullnesses and since the wrapping, whether utilizing a single strip of paper or more than one, returns upon itself, it is completely closed, has no joints or similar points of weakness but is a cortical covering in the true etymological sense of the word, being similar to the husk or rind about nuts. When the article is removed from the package the latter has to be cut open, but because of the solidified adhesive it will retain its molded shape and remain as two shells. It may thus be replaced, if desired, about the article or a similar article and if the joints are carefully sealed the strength of the enclosing covering will be substantially reintegrated.

Having thus described a single embodiment of my invention as an example thereof, the priciples illustrated by this embodiment and which I claim as new and desire to secure by Letters Patent are as follows:—

1. A package comprising a ring-shaped article and an enclosing covering comprising a narrow strip applied in overlapping helical turns extending and continued about the article to provide a plurality of layers, the convolutions and the layers being conglutinated by solidified adhesive, the inner layer being free of adhesive on the interior thereof.

2. A package comprising a ring-shaped article and an enclosing wrapping therefor comprising an inner enclosing layer of helically applied turns of strip presenting a clean, non-adherent inner surface to the article and a second layer of helically applied turns adhesively secured to the inner layer and binding the layers together as an unbroken whole.

In testimony whereof, I have signed my name to this specification.

EDWARD H. ANGIER.